United States Patent
Adur et al.

[11] Patent Number: 6,037,022
[45] Date of Patent: Mar. 14, 2000

[54] OXYGEN-SCAVENGING FILLED POLYMER BLEND FOR FOOD PACKAGING APPLICATIONS

[75] Inventors: Ashok M. Adur, Ramsey, N.J.; Gerald A. Marano, Lynn Haven, Fla.; Raymond A. Volpe, Wethersfield, Conn.; Henry L. Mei, New City, N.Y.

[73] Assignee: International Paper Company, Purchase, N.Y.

[21] Appl. No.: 08/931,381

[22] Filed: Sep. 16, 1997

[51] Int. Cl.[7] .............................. B29D 22/00; B32B 1/08; C01B 3/00
[52] U.S. Cl. .................... 428/34.3; 428/35.7; 428/292.7; 428/411.1; 252/188.28
[58] Field of Search ................. 252/188.28; 428/34.2, 428/34.3, 35.6, 35.7, 292.7, 326, 408, 511, 579.6, 537.5, 537.7, 411.1; 427/395, 391

[56] References Cited

U.S. PATENT DOCUMENTS

| | | | |
|---|---|---|---|
| 3,904,104 | 9/1975 | Kane | 229/3.5 |
| 4,048,361 | 9/1977 | Valyi | 428/35 |
| 4,384,972 | 5/1983 | Nakamura et al. | 252/188.21 |
| 4,510,162 | 4/1985 | Nezat | 426/124 |
| 4,536,409 | 8/1985 | Farrell et al. | 426/398 |
| 4,702,966 | 10/1987 | Farrell et al. | 428/500 |
| 4,752,002 | 6/1988 | Takahashi et al. | 206/204 |
| 5,153,061 | 10/1992 | Cavagna et al. | 428/325 |
| 5,202,052 | 4/1993 | Zenner et al. | 252/188.28 |
| 5,364,555 | 11/1994 | Zenner et al. | 252/188.28 |
| 5,529,833 | 6/1996 | Speer et al. | 428/215 |
| 5,885,481 | 3/1999 | Venkateshwaran et al. | 252/188.28 |

FOREIGN PATENT DOCUMENTS

| | | | |
|---|---|---|---|
| PCT/94/09094 | 4/1994 | WIPO | C09K 15/16 |

*Primary Examiner*—Joseph D. Anthony
*Attorney, Agent, or Firm*—Luedeka, Neely & Graham, P.C.

[57] ABSTRACT

The specification discloses a polymer blend especially well-suited for coating paperboard substrates used in food packaging, particularly acidic or acid-generating foods such as fruit and vegetable juices. The blend contains an acid-activatable oxygen scavenger dispersed in a film-forming synthetic polymer such as an EVOH copolymer. When placed as a film or layer on the side of the substrate inside the container in contact with the food the blend is effective to reduce the oxygen in the container over time to a very low concentration, replacing the same with carbon dioxide, for an excellent preservative effect.

26 Claims, No Drawings

OXYGEN-SCAVENGING FILLED POLYMER BLEND FOR FOOD PACKAGING APPLICATIONS

FIELD OF THE INVENTION

The present invention relates to improved barrier coatings, to methods for coating substrates used in manufacturing food containers and to food containers having coatings which limit certain adverse affects of oxygen on the contents.

BACKGROUND

Various coatings have been applied to paperboard substrates to provide composite materials that may be used for various purposes. In particular, barrier coatings have been applied to paperboard substrates used to make food containers in order to reduce the transport of moisture and oxygen into the food that may spoil or contaminate the food or otherwise disaffect its flavor or shelf life.

Accordingly, for food container applications, paper and paperboard substrates are conventionally coated with barrier coatings selected from various polymers such as polyethylene which provides a moisture barrier and ethylene-vinyl alcohol copolymer (EVOH) to address flavor or property-affecting atmospheric changes in the containers. Such coatings can reduce transmission of moisture and oxygen through the packaging material and provide for longer shelf life for the food packaged in the container. However, some oxygen sensitive foods, such as orange juice, tomato products and fresh meat still have only a relatively short life of a few weeks despite the barrier coatings. The short shelf-life is due, at least in part, to oxidation caused by the oxygen left in the headspace during the package filling step and/or from leakage through the container or through the barrier coatings on the container.

Methods have been devised for reducing the amount of oxygen which is transported through the container. For example, U.S. Pat. No. 5,153,061 to Cavagna et al. describes a barrier coating that may be applied to the inner or outer surface of a paperboard substrate and which absorbs a contaminate emitted by the substrate or provides a tortuous path so that the migration of the contaminate through the barrier layer is reduced. The material used for absorbing contaminants is activated carbon and the ingredient for providing a tortuous path is a delaminated clay pigment. In order to provide a tortuous path layer, the pigment and activated carbon are dispersed in a water soluble binder such as polyvinyl alcohol and applied to the substrate, and a polyethylene terephthalate layer is then coated over the tortuous path layer. While the coatings of Cavagna et al. are said to be effective in reducing the transport of undesirable substances into the food, the process for applying the coating requires multiple steps that significantly increase the cost of producing such coated paperboard products. The clay and carbon coatings of Cavagna et al. do not have oxygen scavenging properties.

U.S. Pat. Nos. 5,202,052 and 5,364,555 to Zenner et al. describe polymeric material carriers containing oxygen scavenging material. The polymeric carriers for the oxygen scavenging material include polyolefin, PVC, polyurethanes, EVA and PET. In the '555 patent, the oxygen scavenging material is a transition metal complex or chelate of a salicylic acid or salicylate salt. In the '052 patent, the oxygen scavenging material is said to be a metal complex or chelate of an organic polycarboxylic acid, preferably an amino polycarboxylic acid. The transition metals include iron, copper, cobalt, or nickel. The material of Zenner et al. is disclosed for use as crown or closure liners for packaging materials, as a gasket or liner applied to an aluminum or plastic crown for plastic or glass bottles, and as a plastic from which plastic bottles may be made. According to Zenner et al., the oxygen scavenging material is activated by contact with water or water vapor. However, a paperboard coated with these materials may be activated prematurely from atmospheric oxygen surrounding the container and thus lose its effectiveness as an oxygen scavenger over time.

U.S. Pat. No. 5,529,833 to Speer et al. describes the use a composition comprising an ethylenically unsaturated hydrocarbon oxygen scavenger which is incorporated into a layer such as film layer and used for making packaging for oxygen-sensitive products. The oxygen scavenger is catalyzed by a transition metal catalyst selected from salts derived from the first, second or third series of transition metals of the Periodic table and a counterion selected from a chloride, acetate, stearate, palmitate, 2-ethylhexanoate, neodecanoate or naphthenate. Preferred metal salts are selected from cobalt (II) 2-ethylhexanoate and cobalt (II) neodecanoate. The components of the composition are mixed by melt-blending at a temperature in the range of 50° to about 300° C. Because water deactivates the oxygen-scavenger composition, the composition can only be used for packaging for dry materials. Furthermore, the oxygen scavenger composition is always active once made due to the presence of the catalyst. Accordingly, the composition loses a considerable amount of its scavenging capacity over time and thus cannot be stored in final form for an extended period of time before use.

Other known materials for reducing the oxygen transport to a food substance include antioxidants such as butylated hydroxyanisole, di-tertiary-butyl-paracresol, propyl gallate, phenylenethiourea and aldolalpha-naphthylamine and granular metals and metal salts contained in water and oxygen permeable packages.

Despite the use of many types of coatings, there remains a need for selection and treatment of a substrate, such as paperboard with a coating which can provide an oxygen scavenging in order to reduce the head space oxygen in the container and thereby reduce the oxidation of the constituents of the food contained therein. Such coatings should also lend themselves to lower cost production techniques.

Accordingly, it is an object of the invention to provide an improved oxygen scavenging blend for use in coating substrates for food packaging applications.

Another object of the invention is to reduce the manufacturing costs of paperboard products containing oxygen barriers.

A further object of the invention is to provide a barrier layer for a paperboard product that can be extruded in a single or multiple operational step.

Still another object of the invention is to produce a container from such a paperboard product containing an improved oxygen scavenging blend.

A unique advantage of this invention is the produced by-product, carbon dioxide. This gas slows down oxygen leakage from outside the container, displaces dissolved oxygen and protects the product from oxidation.

Yet another object of the invention is to provide an extrusion method for applying an oxygen scavenger-containing barrier layer to a paperboard product for use in making food containers.

A additional object of the invention is to provide an oxygen scavenging blend which could either be coated on to a substrate such as paper, paperboard or a non-woven by a process such as mono- or co-extrusion coating or lamination; or used directly after conversion into a film or bag or box or other container by processes known to those skilled in the art, such as blown or cast film or sheet extrusion, blow molding, injection molding, metal or other insert molding, thermoforming, vacuum thermoforming, etc. for the packaging of food and other products.

THE INVENTION

With regard to the above and other objects and advantages, the present invention provides a composition comprising a blend containing from about 0.1 to about 80 percent by weight acid-activatable oxygen scavenger dispersed in a film-forming synthetic polymeric material. The blend may be coated as a layer onto a cellulosic fiber substrate for use in manufacturing a food container in which the surface of the substrate containing the layer is placed on the interior side of the container. The layer is effective in reducing the free oxygen over time in containers filled with acidic food products, replacing the oxygen with carbon dioxide for an excellent and synergistic preservative effect on the contents.

A preferred barrier or contact layer is comprised of from about 20% to about 99.9% by weight low density polyethylene (LDPE), ethylene-vinyl alcohol copolymer (EVOH) or any other film-forming synthetic polymeric material and, mixed therein, from about 0.1% to about 80% by weight of an acid-activatable oxygen scavenger.

In another aspect, the invention provides a method for making a composition useful for coating a substrate suitable for use in producing a food container comprising mixing an acid-activated oxygen scavenger, a dispersion aid or compatibilizer and a film-forming synthetic polymeric material to provide a blend thereof containing from about 0.1 to about 80 wt. % acid-activatable oxygen scavenger, from about 0.001 to about 8 wt. % dispersion aid or compatibilizer and from about 20% to about 99% by weight film-forming polymeric material. Suitable film-forming synthetic polymeric materials may be selected from film-forming polymers such as nylon, polypropylene, polyester, low density polyethylene (LDPE) and ethylene-vinyl alcohol copolymer (EVOH). After compounding the oxygen scavenger and polymeric material in a compounding step, the blend is extruded onto at least the food contact surface of the substrate to provide a film or layer having a thickness ranging from about 1 to about 100 microns, and preferably from 3 to about 5 microns which provides a coating weight of from about 2 to about 4 pounds per 3000 square feet of paperboard substrate.

By "film-forming" it is meant a material which forms or is in the form of a continuous solid film or layer of flexible or rigid synthetic polymeric material.

By "acid-activatable" it is meant the oxygen scavenger becomes activated when the layer containing the oxygen scavenger is contacted with an acid-containing liquid or foodstuff. The acid-activatable oxygen scavenger is preferably ferrous carbonate having a mean particle size less than about 20 microns (>98% pass 325–400 mesh). More preferably, the ferrous carbonate has a particle size 100% below about 2 microns, and most preferably below about 1 micron.

An advantage of the invention is that the barrier layer containing the oxygen scavenger has significantly lower oxygen transmission properties than many other commercially available coatings and is effective in reducing the oxygen content inside the container once activated. Thus, a blend of oxygen scavenger and polymeric material used as a coating on the inside of a sealed container may reduce the oxygen content in the container over time.

Typically, but not necessarily, the blend of acid-activatable oxygen scavenger and film-forming polymeric material is prepared in a separate step. The type of equipment used to prepare the blend may be a conventional compounder. The compounder may be either a twin screw extruder, a kneading extruder or a single screw extruder each having a particular screw configuration which is sufficient to provide enough dispersive and distributive mixing to produce a substantially homogeneous melt mixture of the blended components without significantly degrading the polymer, particularly if the polymer is easily degradable by high localized shear, temperature and residence time. Examples of suppliers of suitable equipment include, but are not limited to, Brabender, Haake, Buss, Egan, Davis-Standard, Werner-Pfleiderer, Welding Engineers, American Leitritz, Toshiba, Japan Steel Works, Farrel and Banbury.

Once blended, the oxygen-activatable scavenger/polymeric material may be extruded onto the paperboard substrate in a single step to provide an oxygen scavenging layer. Coated paperboard products made according to the invention are especially well suited for use with acid-containing liquids and foodstuffs, especially for juice containers or tomato-based product containers. Without desiring to be bound by theoretical considerations, it is believed that acid constituents in the liquid or foodstuff activates the oxygen scavenging ability of the layer by reacting with the oxygen scavenger. When the oxygen scavenger is ferrous carbonate, oxygen reacts with the ferrous ion in the presence of moisture and protons and is converted to water. The ferrous ion itself is oxidized to the ferric ion while the carbonate becomes carbon dioxide that is released into the container. The carbon dioxide released into the container has two benefits. First it replaces the oxygen gas and limits pressure changes on the inside of the container. Secondly the carbon dioxide helps to preserve the contents of the package, whether liquid or other foodstuff.

In order to prepare an oxygen scavenging blend in accordance with a preferred embodiment of the invention, ferrous carbonate is mixed in an amount ranging from about 0.1% to about 80% by weight with from about 20% to about 99% by weight of the film-forming polymeric material. More preferably, the amount of ferrous carbonate in the blend is between about 10% and about 60% and most preferably between about 30% and about 50% by weight of the polymeric material.

The other major component of the barrier layer is selected from the group consisting of film-forming polyolefins, polyamides, polyurethanes, polyesters, nitrile polymer and ethylene-vinyl alcohol copolymers (EVOH). Preferred EVOH copolymers are those products sold under the trade name SOARNOL A4412, K3825 and other resin grades from Nippon Gohsei of Japan and its distributor in the USA, Soarus. Other EVOH copolymers which may be used include EVAL EP-43, G110 and other resin grades from Kuraray Co. Ltd. of Japan or its North American subsidiary EVALCA.

In order to sufficiently disperse the oxygen scavenger in the polymeric material during compounding in an extruder, other materials such as food-grade dispersion aids or compatibilizers may be added to the formulation. It is preferred to mix the ferrous carbonate with a dispersion aid or compatibilizer in the ratio of from about 1 wt. % to about 10 wt. % of total weight of the mixture of ferrous carbonate and dispersion aid or compatibilizer. Once compounded, the blend of ferrous carbonate, dispersion aid and polymeric material is extruded and/or coated onto at least the inner surface of the substrate thereby providing a filled contact or barrier layer comprised of oxygen scavenger and polymeric material. Compatibilizers or dispersion aids which may be used include, but are not limited to food-grade carboxylic acids and their derivatives, such as metal acid salts, acid anhydrides, acid chlorides, and the like such as stearic acid, calcium stearate, succinic acid and maleic anhydride; copolymers of ethylene with vinyl, acrylic or other aliphatic, aromatic and aliphatic organic esters such as ethylene-acrylic acid copolymers, ethylene-methacrylic acid copolymers, and ethylene-maleic anhydride copolymers including the commercially available copolymers from Dow Chemical Company of Midland, Michigan under the tradename PRIMACOR 5980 and from DuPont de Nemours & Company of Wilmington, Del. under the tradename NUCREL 499; various polyolefins include polyethylene and polypropylene grafted with acid or anhydride or other acid derivative functional group such as the compounds available from Allied-Signal of Morristown, N.J. under the tradenames ACTONE 2573P and ACX 575, POLYBOND 1009 and POLYBOND 3009 from Uniroyal Chemical Company of Williamstown, N.J. and EPOLENE E-43P available from Eastman Chemical Company of Kingsport, Tenn.

The acid-activated oxygen scavenger material may be mixed with polyethylene (PE) or EVOH copolymer or other polymer in a variety of ways. Ferrous carbonate, in the form of fine powder, may be dry-mixed with the dispersion aid also in fine powder form, and added into the second feed entrance port of a compounding extruder. Alternatively, the oxygen scavenger and dispersion aid may be added into the main feed port of the extruder, especially if it is in pellet form along with the pellets of EVOH, LDPE, nylon or other polymer.

In order to provide a substantially homogeneous blend, it is important to maintain a precise continuous weight ratio among the polymer pellets, dispersion aid and the ferrous carbonate. Conventional loss-in-weight feeders may be used to control the ratio of components fed to the compounder.

It is particularly preferred to pre-dry the oxygen scavenger for about 8–12 hours at a temperature ranging from about 150° to about 180° C. before mixing the oxygen scavenger with the polymeric material in the extruder so that the moisture content of the oxygen scavenger is less than about 0.2 percent by weight. Similarly the other components in the blend such as the polymer pellets and the dispersion aid should be dried at a drying temperature below the melting point of the polymer and above the temperature needed to dry the material to get the moisture level below about 0.2%, and preferably below about 0.02%.

When compounding ferrous carbonate into EVOH, the extruder is preferably operated with barrel temperatures ranging from about 150° C. to about 250° C., preferably from about 170° C. to about 210° C. at a pressure ranging from about 50 to about 2,000 pounds per square inch (psig).

Extruders with single or multiple screws may be used as long as they provide sufficient dispersive and distributive mixing. The screw speed may range from about 25 to about 500 rpm at a feed rate ranging from about 20 to about 250 pounds per hour (lb./hr). In larger production-size compounding units, the rates may be as high as 50,000 lb./hr or even higher.

After compounding the oxygen scavenger/polymeric material blend, the blend is preferably further dried for from about 4 to about 12 hours at a temperature in the range of from about 100° to about 140° C. Drying is particularly required if the blend is pelletized in a water bath or a under-water or by using a water-ring pelletizer.

The oxygen scavenger material may also be blended with molten polymeric material using a compounding extruder and the mixture then fed as solid pellets or as a molten mass to the feed hopper of an extrusion coater for coating onto paperboard or any other substrate. Other methods known to those of ordinary skill may also be used to obtain a substantially homogeneous mixture of the oxygen scavenger and polymeric material.

After compounding and melting, the substantially homogeneous blend of oxygen scavenger and polymeric material is ready for application to the surface of the substrate in a relatively thin, continuous layer, preferably without any pinholes. The oxygen scavenger filled layer is preferably applied to a substrate in an amount sufficient to provide a coating weight of from about 0.5 to about 25 pounds per 3000 square feet of paperboard, preferably from about 1 to about 10 pounds per 3000 square feet, and most preferably from about 1.5 to about 4.5 pounds per 3000 square feet. Coated weights within the foregoing range provide a layer having a thickness ranging from about 1 to about 30 microns, preferably from about 3 to about 5 microns.

While the present invention is directed to oxygen-scavenging layers for paperboard substrates, the invention is not limited to the extrusion of such layer on cellulosic substrates. Accordingly, the substrate may also be a polymer film or layer, aluminum foil, or a combination or composite of the foregoing materials or paper webs formed partly or wholly of synthetic fibers as well as various textiles. Examples of paperboard substrates include, but are not limited to, bleached paperboard or unbleached paperboard, kraft, sulfide, or multi-ply paperboard and the like. The paperboard weight may range from about 3 lb./3000 square feet to about 500 lb./3000 square feet. A particularly preferred substrate for applying the blend of oxygen scavenger and polymeric material is bleached kraft paperboard made by International Paper Company of Purchase, New York with weights in the range of from about 150 lb. to about 300 lb./3000 square feet and more preferably in the range of from about 180 to about 290 lb./3000 square feet.

Various other coatings or treatments may be applied to the paperboard before or after co-extrusion coating with the oxygen scavenging blend layer. Such other coatings include, but are not limited to, sizing agents, primers and other wet-end and off-line additives.

Other methods known to those of ordinary skill may be used to produce a container containing an oxygen scavenger in accordance with the invention in one or more coatings or layers. Accordingly the container may be a single or multi-layer rigid or flexible polymer structure or plastic article containing a substantially homogeneous mixture of acid-activatable oxygen scavenger in the polymeric material according to the invention. Examples of such a rigid or flexible containers include plastic bottles, jars, pouches, bags and the like.

While it is preferred to have the oxygen scavenger/polymeric material blend only adjacent to the surface of the paperboard substrate to be used on the interior side of a food container, both surfaces may be coated with the polymeric material containing the oxygen scavenger. In addition, other polymeric layers may be used in conjunction with the barrier layer containing the oxygen scavenger. When the polymeric material used for the barrier layer is EVOH, it is preferred to also use a polyolefin layer, preferably polyethylene (PE). When an additional PE layer is used, an adhesive layer or tie layer having a thickness of about 5 microns is preferably used to adhere the PE layer to the oxygen scavenger filled barrier layer. Exemplary structures for food container walls using the blend of oxygen scavenger and polymeric material layer according to the invention are as follows:

LDPE/Paperboard/Nylon/Tie-layer/LDPE/Tie-layer/EVOH+$FeCO_3$

LDPE/Paperboard/Nylon/Tie-layer/LDPE/Tie-layer/EVOH+$FeCO_3$/Tie-layer/LDPE,

LDPE/Paperboard/LDPE/Tie-layer/EVOH/Tie-layer/EVOH+$FeCO_3$,

LDPE/Paperboard/LDPE/Tie-layer/EVOH/Tie-layer/LDPE/Tie-layer/EVOH+$FeCO_3$,

LDPE/Paperboard/Nylon/Tie-layer/LDPE/Tie-layer/
 EVOH/Tie-layer/LDPE+FeCO$_3$,
LDPE/Paperboard/HDPE/Tie-layer/EVOH/Tie-layer/
 EVOH+FeCO$_3$,
LDPE/Paperboard/PET/Tie-layer/EVOH/Tie-layer/EVOH+
 FeCO$_3$,
LDPE/Paperboard/Nylon/Tie-layer/EVOH/Tie-layer/
 ethylene-ionomer copolymer+FeCO$_3$,
HDPE/Paperboard/LDPE/Tie-layer/EVOH/Tie-layer/
 EVOH+FeCO$_3$,
LDPE/Paperboard/Nylon/Tie-layer/LDPE/Tie-layer/
 EVOH/Tie-layer+FeCO$_3$/LDPE, and
LDPE/HDPE/Paperboard/LDPE/Tie-layer/EVOH/Tie-layer/EVOH+FeCO$_3$, wherein the +FeCO$_3$ would comprise ferrous carbonate (FeCO$_3$) as well as any other additives such as antioxidants, dispersion aids, flow agents, lubricants, colorants, and any other additives typically used for making a blend or alloy formulation with a polymeric material. The examples of structures listed above are not meant to limit the invention in any way and coated structures or films wherein FeCO$_3$ is used in one or more other layers is within the scope of this invention. In addition to or in the alternative to specific tie layers, various additives may be included in the polymer materials which modify their surface properties to promote interfacial bonding of the layers. Such additives are described in U.S. Pat. No. 5,464,691 to Gardiner et al., incorporated by reference as if fully set forth.

The following non-limiting examples illustrate one or more aspects of the invention. Unless stated otherwise, all percentages are by weight.

EXAMPLE 1

FeCO$_3$ Filled EVOH

Pellets containing ferrous carbonate and EVOH with various weight ratios of FeCO$_3$ were made using an APC 70 co-kneader available from Buss America, Inc. of Bloomingdale, Ill. The EVOH used was SOARNOL A4412 from Nippon Gohsei of Japan and the ferrous carbonate was fme powder (98% pass 325 mesh) from Norchem Industries of Bremen, Ind. No compatibilizer was used. The compounding kneader had a screw diameter of 70 mm and length to diameter ratio of 13.

Three different weight ratios of EVOH/FeCO$_3$, 90/10, 60/40, and 40/60, were produced. The pellets were dried to 0.02% moisture with a Conair pellet dryer. The processing conditions are summarized in Table 1 below:

TABLE 1

| | | Compounder Processing Conditions | | |
|---|---|---|---|---|
| Run No. | EVOH/FeCO$_3$ (Wt. Ratio) | Temp. (° C.) | Kneader RPM | Output Rate (lb/hour) |
| 1 | 90/10 | 165–218 | 373 | 600 |
| 2 | 60/40 | 157–223 | 373 | 600 |
| 3 | 40/60 | 156–231 | 400 | 600 |

The ferrous carbonate-filled EVOH pellets compounded as described above were used to make barrier coated paperboard. A five layer (A/B/C/B/A) coextrusion coating was used to provide a barrier coating on paperboard and the coated paperboard samples were converted into liquid packaging cartons. In the five layer coating, A is the EVOH/FeCO$_3$ layer, B is an ethylene-maleic anhydride copolymer tie-layer available from Morton International, Inc. of Chicago, Ill. under the tradename TYMOR 1220, and C is low density polyethylene (LDPE) available from Eastman Chemical Company of Kingsport, Tenn. under the tradename TENITE 1924P. The coating weight was 6.5 lb./3MSF (3,000 square feet) for the oxygen scavenger (EVOH/FeCO$_3$) layer, 3 lb./3MSF for the TYMOR 1220 layer and 7 lb./3MSF for TENITE 1924P layer. The processing conditions are given in the following table.

TABLE 2

| | | Extrusion Processing Conditions | | | | | | | |
|---|---|---|---|---|---|---|---|---|---|
| | | Extrusion Temp. (° C.) | | | Extrusion Speed (ppm) | | | Line | Melt Temp. of |
| Run No. | FeCO$_3$ (wt. %) | EVOH | TYMOR 1220 | LDPE | EVOH | TYMOR 1220 | LDPE | Speed (ft/min) | EVOH/FeCO$_3$ (° C.) |
| 1 | 0.00 | 520 | 570 | 570 | 35 | 75 | 100 | 700 | 199 |
| 2 | 10 | 520 | 570 | 570 | 35 | 75 | 100 | 700 | 204 |
| 3 | 40 | 520 | 570 | 570 | 30 | 64 | 85 | 600 | 224 |
| 4 | 60 | 520 | 570 | 570 | 20 | 43 | 57 | 400 | 246 |

Coated paperboard samples and film samples made using the process conditions of Table 2 were tested for their oxygen scavenging effect. The results are listed in Table 3.

TABLE 3

| | | | Oxygen consumed in head space of testing jar (cc per gram of FeCO$_3$)[1] | |
|---|---|---|---|---|
| Sample No. | Wt. % FeCO$_3$ | Sample Type | after 4 weeks | after 10 weeks |
| 1 | 0 | coated paperboard | 0 | 0 |
| 2 | 40 | coated paperboard | 1.97 | 6.16 |
| 3 | 60 | coated paperboard | 2.69 | 7.26 |
| 4 | 40 | film | 5.1 | 8.02 |
| 5 | 60 | film | 4.83 | 13.75 |

[1]Gas chromatography was used to analyze the oxygen content in the head space of the testing jars.

Because a compatibilizer was not used in the compounding, the dispersion of ferrous carbonate in EVOH was believed to be non-optimal reducing the oxygen scavenging effect of the FeCO$_3$ filled material. Nevertheless, there was a significant oxygen scavenging effect compared to the unfilled polymeric coated substrate of Sample No. 1.

EXAMPLE 2

FeCO₃ Filled EVOH With Compatibilizers

Pellets of ferrous carbonate filled EVOH were made using various compatibilizers by extrusion compounding with a Brabender CTSE-V type twin screw extruder. The materials used for the compounding the $FeCO_3$/EVOH are as follows:

EVOH: SOARNOL A4412 in granular form; $FeCO_3$: fine powder available from Norchem Industries of Bremen, Ind.

ACTONE 2573P—an ethylene-maleic anhydride copolymer (1 wt. % maleic anhydride) available from Allied Signal of Morristown, N.J.;

ACX 575—an ethylene-maleic anhydride copolymer (3 wt. % maleic anhydride) available from Allied Signal;

PRIMACOR 5980—an ethylene-acrylic acid (20 wt. % acrylic acid) copolymer available from Dow Chemical Company of Midland, Mich.; and EPOLENE E-43P—a maleic anhydride grafted polypropylene available from Eastman cal Company of Kingsport, Tenn.

Blends of 30 wt. % $FeCO_3$, 68–70 wt. % EVOH and 0–2 wt. % of various compatibilizers are given in Table 4. Blends of 40 wt. % $FeCO_3$, 52–57 wt. % EVOH and 3–8 wt. % of various compatibilizers are given in Table 5.

TABLE 4

| Run No. | EVOH (wt. %) | Compati- bilizer Compound | Wt. % | Temp. Zones (° C.) | Melt Press. (psig) | Screw RPM |
| --- | --- | --- | --- | --- | --- | --- |
| 1 | 70 | None | 0.00 | 175–200 | 80–100 | 10–20 |
| 2 | 68 | calcium stearate | 2 | 175–200 | 100 | 10–20 |
| 3 | 68 | ACTONE 2573P | 2 | 175–200 | 420 | 10–20 |
| 4 | 68 | ACX 575 | 2 | 175–200 | 380 | 10–20 |
| 5 | 68 | PRIMACOR 5980 | 2 | 175–200 | 80–100 | 10–20 |
| 6 | 68 | EPOLENE E-43P | 2 | 175–200 | 400 | 10–20 |

TABLE 5

| Run No. | EVOH (wt. %) | Compati- bilizer Compound | Wt. % | Temp. Zones (° C.) | Melt Press. (psig) | Screw RPM |
| --- | --- | --- | --- | --- | --- | --- |
| 7 | 57 | ACTONE 2573P | 3 | 170–200 | 130 | 45 |
| 8 | 57 | ACX 575 | 3 | 170–200 | 170–200 | 36 |
| 9 | 57 | PRIMACOR 5980 | 3 | 180–200 | 400–500 | 20 |
| 10 | 57 | calcium stearate | 3 | 175–200 | 400–700 | 20 |
| 11 | 55 | ACTONE 2573P | 5 | 164–200 | 12 | 10 |
| 12 | 52 | ACTONE 2573P | 8 | 158–200 | 10 | 12 |

Film samples were made from the pellets according to the process conditions of Tables 4 and 5 using a Brabender TM 2503 single screw extruder. The film samples had a thickness of 2 to 3 mils. The material, processing condition and the properties of the film samples are given in the following table. The quality of the dispersion of $FeCO_3$ in the EVOH was determined by scanning electro-micrograph (SEM).

TABLE 6

| Film Sample No. | Pellet From Table 4 or 5 (Table-Run) | Zone Temps. (° C.) | Extruder Pressure (psig) | Screw Speed (rpm) | Dispersion in Film Samples by SEM |
| --- | --- | --- | --- | --- | --- |
| 1 | 4-1 | 170–190 | 330 | 50 | poor |
| 2 | 4-2 | 170–190 | 330 | 50 | fair |
| 3 | 4-3 | 170–190 | 400 | 50 | good |
| 4 | 4-4 | 170–190 | 400 | 40 | good |
| 5 | 4-5 | 170–200 | 150 | 20 | fair |
| 6 | 4-6 | 170–190 | 400 | 50 | poor |
| 7 | 5-7 | 161–200 | 430 | 12 | fair |
| 8 | 5-8 | 165–200 | 510 | 12 | good |
| 9 | 5-9 | 175–200 | 300 | 15 | fair |
| 10 | 5-10 | 172–200 | 300 | 15 | poor |
| 11 | 5-11 | 185–200 | 130 | 10 | good |
| 12 | 5-12 | 185–200 | 130 | 10 | good |

As shown by the dispersion analysis of the film samples, the best results were obtained by using the ACTONE or ACX compatibilizers to disperse the $FeCO_3$ in the polymeric material. The poorest results were obtained when no compatibilizer was used or when using calcium stearate or EPOLENE compatibilizer.

Oxygen scavenging effect was determined for the samples of Table 6 as the reduction of oxygen content in the head space of the testing bottles. Each testing bottle had a volume of 600 cubic centimeters. Three hundred cubic centimeters of 0.5 wt. % citric acid solution was placed in each bottle and the oxygen scavenger film samples were placed in the bottle, half immersed in the solution. Each bottle was tightly sealed with a rubber stopper and an aluminum cap to prevent air leakage into the bottle. After a period of time, an air sample of the head space was taken with a syringe and injected to a gas chromatography (GC) instrument. A thermal conductivity detector (TCD) was used to analyze the oxygen content. A special GC column was used to separate oxygen from other components (basically nitrogen) and the ratio of oxygen in the gas samples was determined by the ratio of area between the oxygen peak and the nitrogen peak in the GC spectra thereby giving the remaining oxygen in the head space of the testing jars. Since the weight of the ferrous carbonate in the testing film samples were known before the samples were placed into the jars, and the volume of the head space of each jar was known, the consumption of oxygen (cc) per gram of the ferrous carbonate was readily calculated. The results are given in Table 7 for the samples are in terms of Oxygen Transmission Rate (OTR) and volume of oxygen consumed per gram of ferrous carbonate. Oxygen transmission rate (OTR) is the amount of oxygen transmitted through a film sample in a unit of cubic centimeters per square meter per day normalized to a thickness of one mil ($1/1,000$ inch).

TABLE 7

| Film Sample (Table-Sample) | Dispersion Quality by SEM | Oxygen Transmission Rate (OTR) in cc-mil/ sq. m. day | Oxygen Consumption (cc per gram of $FeCO_3$ in 12 weeks) |
| --- | --- | --- | --- |
| 4-2 | fair | 42.61 | 7.89 |
| 4-3 | good | 30.96 | 16.11 |
| 4-4 | good | 30.55 | 16.02 |
| 4-5 | fair | 33.01 | 9.67 |
| 5-11 | good | 83.26 | 32.08 |

The results show that samples made using ACTONE 2573P dispersant, ACX 575 dispersant and EPOLENE E-43P dispersant scavenged significantly more oxygen per gram of FeCO$_3$ than samples made using PRIMACOR 5980 dispersant.

In Table 8, the oxygen consumed per gram of film sample made from pellets 3 and 4 from Table 4 was determined periodically over a period of 109 days. In Tables 9 and 10, the scavenging effect is expressed as the decline of the percentage of oxygen in the head space of the testing jar. The samples for Tables 10 and 11 were made using 40 wt % FeCO$_3$, 55–58 wt. % EVOH (SOARNOL A4412) and a compatibilizer in the amount indicated. In Table 11, the scavenging effect is expressed in cc of oxygen per gram of FeCO$_3$ accumulated for the week of measurement. The oxygen scavenging results are given in the following tables.

TABLE 11-continued

| Sample No. | Compatibilzer (wt. %) | cc of oxygen consumed per gram of FeCO$_3$ accumulated in the week indicated | | | |
|---|---|---|---|---|---|
| | | week 3 | week 6 | week 9 | week 10 |
| 4 | (2 wt. %) ACTONE 2573P (2 wt. %) | 6.75 | 11.9 | 17.1 | 18.7 |

In Tables 10 and 11, the PRIMACOR 2912 contained 9.6 wt. % acrylic acid whereas the PRIMACOR 5890 contained

TABLE 8

| Film Sample (Table-Sample | Cubic centimeters of oxygen consumer per gram of FeCO$_3$ after indicated days | | | | | | | | | | | | | | |
|---|---|---|---|---|---|---|---|---|---|---|---|---|---|---|---|
| | 0 | 4 | 7 | 16 | 24 | 31 | 45 | 53 | 59 | 66 | 73 | 80 | 87 | 94 | 102 | 109 |
| 4-3 | 0 | 0.28 | 1.45 | 3.21 | 6.98 | 8.62 | 12.2 | 11.5 | 13.8 | 15.8 | 17.6 | 19.1 | 21.1 | 21.4 | 21.8 | 22.2 |
| 4-4 | 0 | 0.37 | 0.97 | 1.83 | 6.74 | 8.72 | 12.7 | 14.2 | 14.5 | 15.4 | 16.6 | 18.5 | 19.6 | 21.1 | 21.3 | 21.5 |

TABLE 9

| Film Sample (Table-Sample | Percentage of Oxygen remaining in the head space of the bottles after indicated days | | | | | | | | | | | | | |
|---|---|---|---|---|---|---|---|---|---|---|---|---|---|---|
| | 0 | 4 | 7 | 16 | 24 | 31 | 45 | 53 | 59 | 66 | 73 | 80 | 87 | 94 |
| 4-1 | 20.76 | 20.82 | 20.89 | 20.57 | 20.50 | 20.80 | 20.50 | 20.40 | 20.80 | 20.97 | 20.94 | 21.01 | 20.97 | — |
| 4-2 | 20.76 | 20.51 | 20.38 | 19.81 | 18.10 | 17.30 | 15.70 | 15.40 | 15.20 | 14.60 | 14.10 | 13.40 | 12.60 | — |
| 4-3 | 20.76 | 20.57 | 19.68 | 18.43 | 15.80 | 14.80 | 12.10 | 10.80 | 10.45 | 8.67 | 7.82 | 7.39 | 6.41 | 5.54 |
| 4-5 | 20.76 | 20.63 | 20.19 | 19.48 | 17.90 | 17.00 | 14.90 | 14.10 | 13.80 | 13.30 | 12.50 | 11.60 | 11.00 | — |
| 4-4 | 20.76 | 20.67 | 20.00 | 19.87 | 16.30 | 14.90 | 11.60 | 10.60 | 10.24 | 9.34 | 8.50 | 6.87 | 6.06 | 5.17 |

TABLE 10

| Sample No. | Compatibilzer (wt. %) | Percentage of Oxygen remaining in the head space of the bottles after indicated weeks | | | | | | | | | | | |
|---|---|---|---|---|---|---|---|---|---|---|---|---|---|
| | | 0 | 1 | 2 | 3 | 4 | 5 | 6 | 7 | 8 | 39 | 10 | 11 |
| 1 | ACTONE 2573P (5 wt. %) | 20.50 | 19.71 | 18.68 | 17.86 | 16.55 | 15.68 | 14.64 | 13.74 | 12.78 | 11.29 | 9.98 | 8.69 |
| 2 | ACX 575 (2 wt. %) | 20.60 | — | — | 14.31 | 13.37 | 11.52 | 10.36 | 8.73 | 6.54 | 6.21 | — | 5.15 |
| 3 | PRIMACOR 2912 (4 wt. %) | 20.60 | — | — | 16.85 | 15.09 | 13.08 | 11.63 | 9.81 | 8.41 | 7.31 | — | 6.04 |
| 4 | PRIMACOR 5890 (2 wt. %) | 20.60 | — | — | 16.26 | 14.47 | 12.50 | 11.31 | 9.71 | 8.23 | 7.11 | — | 5.84 |

TABLE 11

| Sample No. | Compatibilzer (wt. %) | cc of oxygen consumed per gram of FeCO$_3$ accumulated in the week indicated | | | |
|---|---|---|---|---|---|
| | | week 3 | week 6 | week 9 | week 10 |
| 1 | ACX 575 (2 wt. %) | 11.9 | 22.80 | 30.5 | 33.5 |
| 2 | PRIMACOR 2912 (4 wt. %) | 7.96 | 19.9 | 28.8 | 31.2 |
| 3 | PRIMACOR 5890 | 8.78 | 20.1 | 28.8 | 31.6 |

20 wt. % acrylic acid. The results show that film samples containing 40% of FeCO$_3$ scavenged oxygen more rapidly than the samples containing 30 wt. % FeCO$_3$. All of the samples containing FeCO$_3$ showed continued oxygen scavenging capacity over a period of up to about 15 weeks. The samples made with ACTONE 2573 and ACX 575 compatibilizers and 30 wt. % FeCO$_3$ gave better results than the samples made with calcium stearate or PRIMACOR 5980. However, when the FeCO$_3$ loading was increased to 40 wt. % (Tables 10 and 11), the samples made with ACX 575, PRIMACOR 2912 and PRIMACOR 5890 gave significantly better results than the samples made with ACTONE 2573 compatibilizer.

EXAMPLE 3

An extrusion compounding trial for ferrous carbonate with EVOH (SOARNOL K3825) and various compatibilizers was conducted using a twin screw extruder (ZSE 50/GGC) having intermeshing counter-rotating screws with a length to diameter ratio of 36. Four hundred pounds of 40 wt. % ferrous carbonate filled EVOH containing 1.75 wt. % compatibilizer were compounded for each sample. The compatibilizers used were ACX 575 and an ethylene-acrylic acid copolymer zinc ionomer available from Allied Signal under the tradename ACLYN 295A. The extruder was run under mild mixing shear conditions. Conventional degassing and pelletizing devices were also used with the extruder. An 18 mm small twin screw extruder was used to make film having a thickness of 2 to 3 mils from the pellets made on the extruder to check the dispersion of ferrous carbonate in the resin. The results and processing conditions are given in the following table. Dispersion of the ferrous carbonate in the film was determined by optical microscopy (OM).

TABLE 12

| Run No. | Compatibilizer | Temp. Zones (° C.) | Melt Temp. (° C.) | Melt Pressure (psig) | Screw RPM | Output Rate (lb/hr) | Dispersion Quality by OM |
|---|---|---|---|---|---|---|---|
| 1 | ACX 575 | 155–211 | 209 | 350–440 | 100 | 100 | excellent |
| 2 | ACX 575 | 155–211 | 218 | 510–660 | 200 | 200 | excellent |
| 3 | ACLYN 295A | 155–211 | 218 | 450–460 | 200 | 200 | excellent |

EXAMPLE 4

An extrusion compounding trial for ferrous carbonate with LDPE having a melt index of 7 available from Chevron Chemical Company of San Ramon, Calif. under the tradename CHEVRON 1017 was conducted using a twin screw extruder (ZSE 50/GGC) having intermeshing counter-rotating screws with a length to diameter ratio of 36. Three hundred pounds of ferrous carbonate filled LDPE containing no compatibilizer were compounded for runs 1–3 and three hundred pounds of ferrous carbonate filled LDPE containing 1.75 wt. % compatibilizer were compounded for runs 4–6. The compatibilizer used was ACX 575. The extruder was run under mild mixing shear conditions. Conventional degassing and pelletizing devices were also used with the extruder. An 18 mm small twin screw extruder was used to make film having a thickness of 2 to 3 mils from the pellets compounded on the twin-screw extruder to check the dispersion of ferrous carbonate in the resin. The results and processing conditions are given in the following table.

As shown in the table, blends of LDPE and $FeCO_3$ with less than 50 wt. % $FeCO_3$ produced films having excellent dispersion even without compatibilizers at a relatively low extruder screw speed. At 50 wt. % $FeCO_3$, the dispersion was not as good at a screw speed of 200 rpm, but improved at an rpm of 300. When a compatibilzer is added to the $FeCO_3$/LDPE blend, excellent dispersion was obtained even at 200 rpm. At about 60 wt. % $FeCO_3$, even with a compatibilizer and a screw speed of 300 rpm, the dispersion quality was only fair.

EXAMPLE 5

Six hundred pounds of ferrous carbonate filled EVOH containing compatibilizers were made using a MDK/E 46 single screw kneader. The ferrous carbonate content of the EVOH was 40%. The compatibilizer used was ACX 575 at 1.75 wt. % of the total weight of the compounded blend. The EVOH used is available from Kuraray of Japan under the tradename EVAL G110. In this series of runs the EVOH had a higher melt flow index (14 at 190° C.) than the SOARNOL A4412 EVOH. It was expected that the higher melt flow index would result in easier compounding of the blend. The compounding equipment used was a Buss MDK/E 46 Kneader with screw diameter of 46 mm and length to diameter ratio of 11. A gear pump was used to discharge the compounded blend from the compounder. A Buss LWG 70 die face pelletizer was used for pelletizing the compounded samples. K-TRON LWF T-37 loss-in-weight feeders and ELS 46 feeders were used for metering and feeding the compounder and pelletizer. Conventional degassing and drying units were also used. Film samples of 2 to 3 mils thick were made from the pellets with a Brabender 2503 single screw extruder in order to check the dispersion of ferrous carbonate in EVOH. The results and processing

TABLE 13

| Run No. | $FeCO_3$ (wt. %) | Compatibilizer | Temp. Zones (° C.) | Melt Temp. (°0 C.) | Melt Pressure (psig) | Screw RPM | Output Rate (lb/hr) | Dispersion Quality by OM |
|---|---|---|---|---|---|---|---|---|
| 1 | 40 | none | 170–193 | 192 | 340 | 260 | 100 | excellent |
| 2 | 50 | none | 170–194 | 196 | 450 | 200 | 120 | good |
| 3 | 50 | none | 170–193 | 210 | 570 | 300 | 120 | excellent |
| 4 | 50 | ACX 575 | 170–196 | 196 | 570 | 200 | 120 | excellent |
| 5 | 50 | ACX 575 | 178–194 | 206 | 600 | 300 | 200 | excellent |
| 6 | 60 | ACX 575 | 170–193 | 199 | 600 | 300 | 120 | fair | conditions are given in the following table.

TABLE 14

| Run No. | Compatibilizer | Temp. Zones (° C.) | Screw RPM | Output Rate (lb/hr) | Dispersion Quality by OM |
|---|---|---|---|---|---|
| 1 | ACX 575 | 174–198 | 261 | 100 | excellent |
| 2 | ACX 575 | 175–205 | 358 | 100 | excellent |
| 3 | ACX 575 | 170–207 | 260 | 100 | excellent |

In all cases, use of a compatibilizer to make the blend resulted in excellent dispersion of the oxygen scavenger in the polymeric materials.

EXAMPLE 6

Three hundred pounds of ferrous carbonate filled EVOH made with compatibilizers were made using a Welding 2 inch counter-rotating non-intermeshing twin screw extruder with a length to diameter ratio of 30. The EVOH used was EVAL G110 and the compounded EVOH contained 40 wt. % $FeCO_3$. The results and processing conditions are given in the following table.

TABLE 15

| Compatibilizer | Output Rate (lb/hr) | Screw RPM | Melt Temperature (° C.) | Dispersion Quality of Film by OM |
|---|---|---|---|---|
| ACX 575 | 150 | 150 | 201 | excellent |

Compounding the oxygen scavenger and polymeric material in the presence of a dispersant resulted in excellent dispersion of the oxygen scavenger with a twin-screw extruder under the indicated processing conditions.

EXAMPLE 7

An extrusion compounding trial for ferrous carbonate with LDPE was conducted using a Toshiba TEM-58BS high shear co-rotating fully intermeshing twin screw extruder available from Welding Engineers of Bluebell, Pennsylvania to compound the ferrous carbonate LDPE. About 400 lb. of 50 wt. % ferrous carbonate filled LDPE were made using TENITE 1924P having a melt index of 4.5 dg/min. and 1.75 wt. % ACX 575 as the compatibilizer. The processing conditions and dispersion results of films made from the pellets are given in the following table.

TABLE 16

| Run No. | Output Rate (lb/hr) | Screw RPM | Melt Temperature (° C.) | Dispersion Quality of Film by OM |
|---|---|---|---|---|
| 1 | 500 | 300 | 199 | excellent |
| 2 | 500 | 400 | 200 | excellent |

As shown in the table, dispersion of the oxygen scavenger in the polymeric materials was excellent using the compounder and conditions indicated.

EXAMPLE 8

Two commercial multi-layer barrier packaging structures, Dual Lock II (DL II) containing eight polymeric coating layers and Barrier Pak 2000 (BP 2000) containing nine polymeric coating layers were made using EVOH and LDPE compounded with and without $FeCO_3$ on various compounding machines. The paperboard web width was 36 inches for the DL II samples and 23 inches for the BP 2000 samples. The coating line speed was 500 feet per minute for the DL II samples and 1000 feet per minute for the BP 2000 samples. For each run, enough coated board was made to make 500 half gallon carton orange juice containers. The coated paper board samples are given in the following table.

TABLE 17

| Sample No. | Paperboard Material | $FeCO_3$ (wt. %) | Filled Polymer | Compatibilizer (wt. %) | Compounder used | Coated layer (lb/3MSF) |
|---|---|---|---|---|---|---|
| 1 | DL II | none | SOARNOL A4412 | none | none | contact layer (3.25) |
| 2 | DL II | none | SOARNOL K3808 | none | none | contact layer (3.25) |
| 3 | DL II | 40 | SOARNOL K3825 | none | ZSE 50/GGC twin screw extruder | contact layer (5.4) |
| 4 | DL II | 40 | EVAL G110 | none | APC 70 co-kneader | contact layer (5.4) |
| 5 | DL II | 40 | EVAL G110 | none | Toshiba twin screw extruder | contact layer (5.4) |
| 6 | DL II | 50 | LDPE CHEVRON 1017 | NONE | ZSE 50/GGC twin screw extruder | barrier layer (12 and 4) |
| 7 | DL II | 50 | LDPE CHEVRON | ACX 575 (1.75) | ZSE 50/GGC twin screw | barrier layer (12 and 4) |

TABLE 17-continued

| Sample No. | Paperboard Material | FeCO₃ (wt. %) | Filled Polymer | Compatibilizer (wt. %) | Compounder used | Coated layer (lb/3MSF) |
|---|---|---|---|---|---|---|
| 8 | BP 2000 | none | LDPE TENITE 1924P | none | extruder none | contact layer barrier layer (each with 4) |
| 9 | BP 2000 | 50 | LDPE CHEVRON 1017 | none | ZSE 50/GGC twin screw extruder | contact layer barrier layer (each with 6.4) |
| 10 | BP 2000 | 50 | LDPE CHEVRON 1017 | ACX 575 (1.75) | ZSE 50/GGC twin screw extruder | contact layer barrier layer (each with 6.4) |
| 11 | BP 2000 | 50 | LDPE TENITE 1924P | ACX 575 (1.75) | Toshiba twin screw extruder | contact layer barrier layer (each with 6.4) |

The coated paperboard samples were submitted for SEM analysis to determine the dispersion quality and OTR measurement. Results of the analysis are given in the following table for the indicated samples.

TABLE 18

| Sample No. | Sample Identification | Apparent Dispersion of FeCO₃ | OTR in cc/100 sq. in./day | Dispersion of FeCO₃ by SEM |
|---|---|---|---|---|
| 1 | Control, no FeCO₃ | — | 0.14 | — |
| 2 | Control, no FeCO₃ | — | 0.13 | — |
| 3 | 40 wt. % FeCO₃ in contact layer | fair | 10.13 | good |
| 4 | 40 wt. % FeCO₃ in contact layer | good | 0.82 | best dispersion |
| 5 | 40 wt. % FeCO₃ in contact layer | good | 2.95 | second best dispersion |
| 6 | 50 wt. % FeCO₃ in barrier layer | fair | 0.83 | good, but larger particles |
| 8 | control, no FeCO₃ | — | failed | small gels and holes |
| 9 | 50 wt. % FeCO₃ in contact and barrier layer | poor | — | — |
| 10 | 50 wt. % FeCO₃ in contact and barrier layer | fair | 3.56 | good, but larger particles |
| 11 | 50 wt. % FeCO₃ in contact and barrier layer | poor | — | — |

Three of the foregoing coated paperboard samples were converted into orange juice cartons. The coated paperboard used was sample 2 which contained no oxygen scavenger (Control), sample 4 which contained 40 wt. % FeCO₃ in EVOH as a contact layer (DL II-Table 17, #4) and sample number 10 which contained 50 wt. % FeCO₃ in LDPE as a contact layer (BP 2000—Table 17, #10). The orange juice cartons were filled with TROPICANA SEASON's BEST orange juice. The testing included oxygen content in the head space of the cartons, dissolved oxygen in the juice, Vitamin C concentration in the juice, total iron concentration in the juice and freshness of the juice. The cartons were filled up with orange juice in Cincinnati, Ohio and delivered to Tuxedo, N.Y. by a refrigerated truck. The first measurements were conducted three days after the filling the cartons with juice. All the cartons were kept in a temperature controlled cool room at 8.3° C. Three cartons of each type (control and paperboard coated with oxygen scavenger layer) were opened for measurement and discarded after the measurement. The testing period was 12 weeks and the results are given in the following table.

TABLE 19

| Properties | Sample Ident. Table-Sample No. | Days of Testing | | | | | | | | | | | | |
|---|---|---|---|---|---|---|---|---|---|---|---|---|---|---|
| | | 3 | 10 | 17 | 24 | 31 | 38 | 45 | 52 | 59 | 66 | 73 | 80 | 87 |
| Head Space Oxygen (%) | Control | 20.78 | 19.82 | 18.06 | 16.79 | 14.53 | 12.24 | 9.87 | 8.50 | 7.70 | 5.40 | 3.70 | 2.20 | 1.70 |
| | DL II-(17-4) | 19.48 | 14.16 | 10.97 | 6.45 | 1.21 | 0 | 0 | 0 | 0 | 0 | 0 | 0 | 0 |
| | BP 2000-(17-10) | 17.95 | 12.47 | 7.22 | 2.04 | 0 | 0 | 0 | 0 | 0 | 0 | 0 | 0 | 0 |
| Dissolved Oxygen (%) | Control | 7.76 | 6.78 | 5.38 | 3.76 | 2.74 | 1.95 | 1.62 | 1.16 | 0.65 | 0 | 0 | 0 | 0 |
| | DL II-(17-4) | 4.95 | 1.5 | 1.03 | 0 | 0 | 0 | 0 | 0 | 0 | 0 | 0 | 0 | 0 |
| | BP 2000-(17-10) | 5.15 | 1.44 | 0.64 | 0 | 0 | 0 | 0 | 0 | 0 | 0 | 0 | 0 | 0 |
| Vitamin C in Juice (mg/L) | Control | 458 | 453 | 445 | 439 | 429 | 422 | 405 | 394 | 382 | 367 | 348 | 330 | 314 |
| | DL II-(17-4) | 466 | 462 | 456 | 449 | 446 | 445 | 443 | 435 | 433 | 430 | 429 | 423 | 418 |
| | BP 2000-(17-10) | 474 | 470 | 466 | 459 | 452 | 451 | 447 | 438 | 446 | 436 | 435 | 430 | 425 |
| Total Iron in Juice | Control | 1.7 | 1.8 | 1.8 | 1.5 | 1.6 | 1.3 | 1.7 | 1.6 | 1.6 | 1.7 | 1.1 | 1.1 | 0.94 |
| | DL II-(17-4) | 2.9 | 4.2 | 5.3 | 6.2 | 7.3 | 7.3 | 8.3 | 9.9 | 10.3 | 10.9 | 10.9 | 11 | 12.3 |

TABLE 19-continued

| Properties | Sample Ident. Table-Sample No. | \multicolumn{13}{c}{Days of Testing} | | | | | | | | | | | | |
|---|---|---|---|---|---|---|---|---|---|---|---|---|---|---|
| | | 3 | 10 | 17 | 24 | 31 | 38 | 45 | 52 | 59 | 66 | 73 | 80 | 87 |
| mg/L | BP 2000-(17-10) | 2.2 | 2.9 | 3.5 | 3.7 | 4.1 | 3.8 | 4.3 | 5.2 | 5.1 | 5.2 | 5.3 | 5.7 | 5.2 |
| Freshness | Control | yes | yes | yes | yes | yes | yes | yes | less | less | less | less | no | no |
| | DL II-(17-4) | yes | yes | yes | yes | yes | yes | yes | yes | yes | yes | yes | yes | yes |
| | BP 2000-(17-10) | yes | yes | yes | yes | yes | yes | yes | yes | yes | yes | yes | yes | yes |

The results showed that for cartons containing a contact layer comprising EVOH or LDPE containing the acid-activated oxygen scavenger (FeCO$_3$), the oxygen content inside the cartons reached zero in 3–4 weeks. In the same cartons, the Vitamin C level of the juice remained high (>400 mg/L) after 87 days as compared to less than about 400 for the control sample after 52 days. Juice in cartons made without using an oxygen scavenger layer lost their freshness after about 52 days as compared to juice cartons containing an oxygen scavenger according to the invention which kept the juice fresh for 87 days or more.

During testing period, the total iron content of the juice in the oxygen scavenger coated cartons increased slightly to about 12 mg/L which is far below the FDA limit. There was no observed color change in the juice and no abnormal phenomena or properties of the juice were observed for the oxygen scavenger coated cartons. Based on the results, it was concluded that coated paperboard samples made according to the invention containing an acid-activatable oxygen scavenger will provide significantly longer shelf life for orange juice than conventional cartons which are not coated with an oxygen scavenger containing layer.

Having described the invention and advantages thereof, it will be recognized that the invention is susceptible to various modifications, substitutions and revisions by those of ordinary skill within the spirit and scope of the appended claims.

What is claimed is:

1. A food container comprising a layer consisting essentially of a film-forming synthetic polymeric material and from about 10 to about 80 percent by weight ferrous carbonate dispersed in the polymeric material by means of an optional dispersant or compatibilizer.

2. A food container which includes a wall defining a food contact surface and an outer surface, the outer surface of the wall being defined by a layer containing at least one polyolefin material and the food contact surface of the wall being defined by an oxygen scavenger layer consisting essentially of a blend of from about 10 to about 80 percent by weight ferrous carbonate disposed in a film-forming synthetic polymeric material by means of an optional dispersant or compatibilizer.

3. The container of claim 2 wherein the ferrous carbonate has a mean particle size of below about 2 microns.

4. The container of claim 2 wherein the oxygen scavenger layer contains from about 10 to about 60 percent by weight ferrous carbonate.

5. The container of claim 2 wherein the oxygen scavenger layer contains from about 30 to about 50 percent by weight ferrous carbonate.

6. The container of claim 2 wherein the polymeric material is selected from the group consisting of polyolefins, polyamides, polyurethanes, polyesters, nitrile polymers and ethylene/vinyl alcohol copolymers (EVOH).

7. The container of claim 2 wherein the polymeric material is selected from the group consisting of EVOH, low density polyethylene (LDPE) and high density polyethylene (HDPE).

8. The container of claim 2 wherein the oxygen scavenger layer further comprises a compatibilizer or dispersant for dispersing the oxygen scavenger in the polymeric material.

9. The container of claim 2 wherein the wall includes a paperboard web located interiorly of the polyolefin and the oxygen scavenger layers.

10. A multi-layer composite comprising a paper or paperboard substrate having opposed surfaces one of which is coated with a layer comprising a polyolefin, and at least one layer adjacent the other surface consisting essentially of from about 10 to about 80 percent by weight ferrous carbonate dispersed in a synthetic film-forming polymer material by means of an optional dispersant or compatibilizer.

11. The composite of claim 10 wherein the ferrous carbonate has a mean particle size of below about 2 microns.

12. The composite of claim 10 wherein the layer containing the ferrous carbonate contains from about 10 to about 60 percent by weight ferrous carbonate.

13. The composite of claim 10 wherein the layer containing the ferrous carbonate contains from about 30 to about 50 percent by weight ferrous carbonate.

14. The composite of claim 10 wherein the polymeric material is selected from the group consisting of polyolefins, polyamides, polyurethanes, polyesters, nitrile polymers and ethylene/vinyl alcohol copolymers (EVOH).

15. The composite of claim 10 wherein the polymeric material is selected from the group consisting of EVOH, low density polyethylene (LDPE) and high density polyethylene (HDPE).

16. The composite of claim 10, wherein the layer containing the polyolefin contains from about 10 to about 80 percent by weight ferrous carbonate.

17. A method for making coated paper or paperboard substrate suitable for food container production which comprises applying to the substrate or to a previously applied coating on the substrate at least one layer consisting essentially of from about 10 to about 80 percent by weight ferrous carbonate dispersed in from about 20 to about 90 wt. % film-forming synthetic polymeric material by means of an optional dispersant or compatibilizer.

18. The method of claim 17 wherein the ferrous carbonate has a mean particle size of below about 2 microns.

19. The method of claim 17 wherein the layer contains from about 10 to about 60 percent by weight ferrous carbonate.

20. The method of claim 17 wherein the layer contains from about 30 to about 50 percent by weight ferrous carbonate.

21. The method of claim 17 wherein the polymeric material is selected from the group consisting of polyolefins, polyamides, polyurethanes, polyesters, nitrile polymers and ethylene/vinyl alcohol copolymers (EVOH).

22. The method of claim 17 wherein the polymeric material is selected from the group consisting of EVOH, low density polyethylene (LDPE) and high density polyethylene (HDPE).

23. The method of claim 17 wherein the layer further comprises a dispersant or compatibilizer effective to disperse the ferrous carbonate in the polymeric material.

24. The method of claim 17 further comprising applying an additional layer of film-forming polymeric material onto the layer containing the ferrous carbonate.

25. The method of claim 17 wherein the substrate has applied thereto the previously applied coating comprising a film-forming polymer selected to block passage of water therethrough.

26. A food package or container containing a coated substrate made by the process of claim 17.

* * * * *

UNITED STATES PATENT AND TRADEMARK OFFICE
CERTIFICATE OF CORRECTION

PATENT NO : 6,037,022
DATED : March 14, 2000
INVENTOR(S): Ashok M. ADUR, et al.

It is certified that error appears in the above-identified patent and that said Letters Patent is hereby corrected as shown below:

Column 2, line 40, after "paperboard" add a comma.
Column 3, line 7, after "etc." add a comma.
Column 4, line 67, after "limited to" add a comma.
Column 5, line 22, after "aid", add a comma.
Column 5, line 48, after "210° C." add a comma.
Column 8, Table 2, in the heading, after "Extrusion Speed" delete "(ppm)", and insert --(rmp)--.
Column 16, line 30, after "layers" add a comma.
Column 9, line 24, after "Eastman" delete "cal" and add --Chemical--.
Column 11, Table 10, under "Percentage of Oxygen remaining in the head space of the bottles after indicated weeks", the indicated weeks should be 0 - 11. Therefore, delete "39" and insert --9--.

In the Claims:

Claim 1, Column 19, line 42, after "polymeric material" delete "by means of" and insert --and--.

Claim 1, Column 19, line 43, after "compatibilizer" add --for promoting dispersion of the ferrous carbonate in the polymeric material.--.

Claim 2, Column 19, line 51, after "material" delete "by means of" and insert --and--.

UNITED STATES PATENT AND TRADEMARK OFFICE
CERTIFICATE OF CORRECTION

PATENT NO. : 6,037,022
DATED : March 14, 2000
INVENTOR(S) : Ashok M. Adur et al

It is certified that error appears in the above-identified patent and that said Letters Patent is hereby corrected as shown below:

Claim 2, Column 19, line 52, after "compatibilizer" add --for promoting dispersion of the ferrous carbonate in the polymeric material--.

Claim 10, Column 20, line 26, after "material" delete "by means of" and insert --add--.

Claim 10, Column 20, lines 26-27, after "compatibilizer" add --for promoting dispersion of the ferrous carbonate in the polymeric material--.

Claim 17, Column 20, line 54, after "material" delete "by means of" and insert --and--.

Claim 17, Column 20, line 55, after "compatibilizer" add --for promoting dispersion of the ferrous carbonate in the polymeric material--.

Signed and Sealed this

Twentieth Day of February, 2001

*Attest:*

NICHOLAS P. GODICI

*Attesting Officer*   Acting Director of the United States Patent and Trademark Office